United States Patent
Schumacher et al.

(10) Patent No.: US 10,260,980 B2
(45) Date of Patent: Apr. 16, 2019

(54) PRESSURE SENSOR WITH MINERAL INSULATED CABLE

(71) Applicant: Rosemount Inc., Chanhassen, MN (US)

(72) Inventors: Mark Stephen Schumacher, Minneapolis, MN (US); David Andrew Broden, Andover, MN (US)

(73) Assignee: ROSEMOUNT INC., Chanhassen, MN (US)

( * ) Notice: Subject to any disclaimer, the term of this patent is extended or adjusted under 35 U.S.C. 154(b) by 254 days.

(21) Appl. No.: 14/039,233

(22) Filed: Sep. 27, 2013

(65) Prior Publication Data
US 2015/0090040 A1 Apr. 2, 2015

(51) Int. Cl.
*G01L 19/06* (2006.01)
*G01L 19/14* (2006.01)
*G01L 19/00* (2006.01)

(52) U.S. Cl.
CPC .......... *G01L 19/06* (2013.01); *G01L 19/0084* (2013.01); *G01L 19/0636* (2013.01); *G01L 19/0645* (2013.01); *G01L 19/149* (2013.01); *Y10T 29/49117* (2015.01)

(58) Field of Classification Search
CPC ...................................................... G01L 19/06
See application file for complete search history.

(56) References Cited

U.S. PATENT DOCUMENTS

| | | |
|---|---|---|
| 4,367,727 A | 1/1983 | Llorach |
| 4,950,084 A * | 8/1990 | Bailleul ................... G01B 7/14 361/181 |
| 5,524,492 A | 6/1996 | Frick et al. |
| 5,637,802 A | 6/1997 | Frick et al. |
| 5,665,899 A | 9/1997 | Willcox |
| 5,731,522 A | 3/1998 | Sittler |
| 6,064,002 A | 5/2000 | Hayami et al. |

(Continued)

FOREIGN PATENT DOCUMENTS

| | | |
|---|---|---|
| CN | 2900784 | 5/2007 |
| CN | 203824685 | 9/2014 |

(Continued)

OTHER PUBLICATIONS

Notification of Transmittal of the International Search Report and the Written Opinion of the International Searching from PCT/US2014/051429, dated Dec. 23, 2014.

(Continued)

*Primary Examiner* — Son T Le
*Assistant Examiner* — Herbert K Roberts
(74) *Attorney, Agent, or Firm* — Westman, Champlin & Koehler, P.A.

(57) ABSTRACT

A pressure measurement system is provided. The system includes a pressure sensing probe extendable into a process fluid and having a pressure sensor with an electrical characteristic that varies with process fluid pressure. A mineral insulated cable has a metallic sheath with a distal end attached to the pressure sensing probe and a proximal end. The mineral insulated cable includes a plurality of conductors extending within the metallic sheath and being spaced from one another by an electrically insulative dry mineral. The proximal end of the metallic sheath is configured to be sealingly attached to a process fluid vessel.

13 Claims, 3 Drawing Sheets

(56) References Cited

U.S. PATENT DOCUMENTS

| | | |
|---|---|---|
| 6,079,276 A | 6/2000 | Frick et al. |
| 6,082,199 A | 7/2000 | Frick et al. |
| 6,089,097 A | 7/2000 | Frick et al. |
| 6,425,290 B2 | 7/2002 | Willcox et al. |
| 6,473,711 B1 | 10/2002 | Sittler et al. |
| 6,480,131 B1 | 11/2002 | Roper et al. |
| 6,484,585 B1 | 11/2002 | Sittler et al. |
| 6,505,516 B1 | 1/2003 | Frick et al. |
| 6,508,129 B1 | 1/2003 | Sittler |
| 6,516,671 B2 | 2/2003 | Romo et al. |
| 6,520,020 B1 | 2/2003 | Lutz et al. |
| 6,561,038 B2 | 5/2003 | Gravel et al. |
| 6,848,316 B2 | 2/2005 | Sittler et al. |
| 8,122,771 B2 | 2/2012 | Seeberg et al. |
| 2004/0250602 A1* | 12/2004 | Leverrier ............ G01L 19/003 73/31.05 |
| 2005/0172721 A1 | 8/2005 | Daigle |
| 2010/0257938 A1* | 10/2010 | Kurtz ................ G01L 9/0054 73/727 |
| 2015/0090040 A1 | 4/2015 | Schumacher et al. |

FOREIGN PATENT DOCUMENTS

| | | | |
|---|---|---|---|
| DE | 94 21 746 U1 | 9/1996 | |
| GB | 578 632 | 7/1946 | |
| GB | 578632 A * | 7/1946 | ............... G01L 7/06 |
| GB | 1524981 A * | 9/1978 | ........... G01L 9/0005 |
| GB | 1 524 981 | 9/1989 | |
| WO | WO 01/50104 | 7/2001 | |
| WO | WO 0150104 A2 * | 7/2001 | ........... G01L 9/0075 |
| WO | WO 2012/066323 | 5/2012 | |
| WO | WO 2012066323 A2 * | 5/2012 | ............ E21B 47/06 |

OTHER PUBLICATIONS

Office Action from Chinese Patent Application No. 201410085849.3, dated Jun. 1, 2016.
Office Action from Australian Patent Application No. 2014328656, dated Jul. 11, 2016.
Office Action from European Patent Application No. 14783923.7, dated May 4, 2016.
Rejection Notice (including English translation) from the Japan Patent Office, Japanese Patent Appl. No. 2016-516934, dated Oct. 26, 2016, 4 pages.
Office Action from Japanese Patent Application No. 2016-516934, dated Feb. 1, 2017.
Office Action from Chinese Patent Application No. 201410085349.3, dated Feb. 13, 2017.
Office Action for Russian Patent Application No. 2016116262, dated Mar. 23, 2017, 17 pages.
Office Action from Canadian Patent Application No. 2,923,150, dated Jan. 9, 2017.

* cited by examiner

PRESSURE SENSOR WITH MINERAL INSULATED CABLE

BACKGROUND

Industrial process control systems are used to monitor and control industrial processes used to produce or transfer fluids or the like. In such systems, it is typically important to measure "process variables" such as temperatures, pressures, flow rates, and others. Process control transmitters measure such process variables and transmit information related to the measured process variable back to a central location such as a central control room.

One type of process variable transmitter is a pressure transmitter which measures process fluid pressure and provides an output related to the measured pressure. This output may be a pressure, a flow rate, a level of a process fluid, or other process variable that can be derived from the measured pressure. The pressure transmitter is configured to transmit information related to the measured pressure back to the central control room. Transmission is typically provided over a two-wire process control loop, however, other communication techniques are sometimes used.

Generally, the pressure is sensed by a pressure sensor that is coupled to the process variable transmitter and is coupled to the process fluid by some type of process coupling. In many instances, the pressure sensor is fluidically coupled to the process fluid either through an isolation fluid or by direct contact with the process fluid. The pressure of the process fluid causes a physical deformation to the pressure sensor which generates an associated electrical change in the pressure sensor such as capacitance or resistance.

In many industrial pressure measurement applications, pressure barriers are required. A pressure barrier is a mechanical structure that contains process fluid pressure in order to ensure the safety of plant personnel. As such, pressure barriers are key requirements for a process fluid pressure measurement system. In order to provide a safe and robust system, some applications require redundant pressure barriers to ensure the safety of plant personnel in the event of failure of a primary pressure barrier. Thus, if a primary barrier (such as an isolation diaphragm) fails, the process fluid is still contained by the secondary barrier (such as a glass/metal header).

SUMMARY

A pressure measurement system is provided. The system includes a pressure sensing probe extendable into a process fluid and having a pressure sensor with an electrical characteristic that varies with process fluid pressure. A mineral insulated cable has a metallic sheath with a distal end attached to the pressure sensing probe and a proximal end. The mineral insulated cable includes a plurality of conductors extending within the metallic sheath and being spaced from one another by an electrically insulative dry mineral. The proximal end of the metallic sheath is configured to be sealingly attached to a process fluid vessel.

DETAILED DESCRIPTION OF ILLUSTRATIVE EMBODIMENTS

Pressure barriers can take various forms. For example, a process isolation diaphragm generally works well as a primary pressure barrier. Additionally, remote seal capillary systems can be an effective secondary barrier. Glass or ceramic headers allow effective electrical connections while also providing a useful pressure barrier. Finally, pressure sensors themselves can be designed to contain pressure and thus serve as a pressure barrier. As set forth above, pressure barriers are extremely important in process fluid pressure measurement because they ensure the integrity of the process fluid. However, pressure barriers create a number of challenges. Such challenges include costs, complexity, size, reliability, and compliance.

In accordance with embodiments of the present invention, a mineral insulated (MI) cable is used as a secondary seal in a pressure measurement system. This leverages the technology of MI cables to provide a highly configurable, low cost secondary seal. For example, the technology for manufacturing MI cable is mature and provides very robust structures at low cost. In order to produce MI cable, one or more wires are suspended inside a metal tube. The wire(s) are surrounded by a dry ceramic powder, such as Magnesium Oxide. The overall assembly is then pressed between rollers to reduce its diameter (and increase its length). Up to seven conductors are often found in an MI cable, with up to 19 conductors available from some manufacturers. MI cable is very robust and can operate at very high temperatures. Testing has determined that MI cable is operable at pressures around 40 bar and product literature indicates that MI cable can retain pressure up to at least 10,000 psi.

Figure 1:
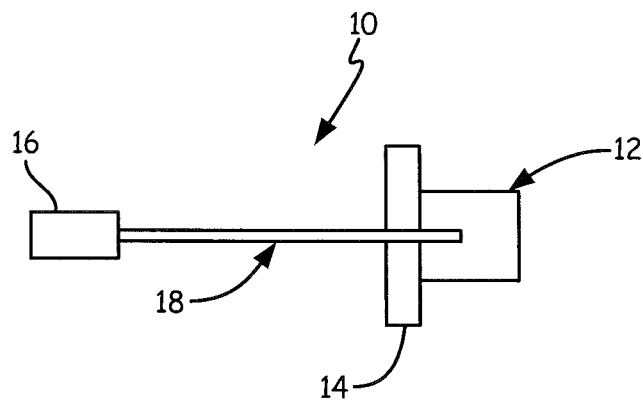
FIG. 1 is a diagrammatic view of a pressure sensing probe employing an MI cable in accordance with an embodiment of the present invention.

FIG. 1 is a diagrammatic view of a pressure sensing probe employing an MI cable in accordance with an embodiment of the present invention. Process pressure measurement system 10 includes an electronics compartment 12 coupled to a metallic flange 14. Flange 14 includes a number of bolt holes 15 (shown in FIG. 2) that facilitate mounting system 10 to a process fluid conduit or reservoir. A pressure sensor assembly 16 is electrically coupled to electronics compartment 12 by MI cable 18, which also physically supports pressure sensor assembly 16. Electronics compartment 12 contains circuitry to measure an electrical characteristic of one or more sensors disposed within assembly 16. Electronics compartment 12 also preferably includes circuitry for transmitting information relative to the measured electrical characteristic(s) to other devices over a suitable process industry communication protocol such as 4-20 mA, the Highway Addressable Remote Transducer (HART®) Protocol, Foundation™ Fieldbus, wireless process communication protocols, such as IEC62591 or other suitable protocols.

Figure 2:
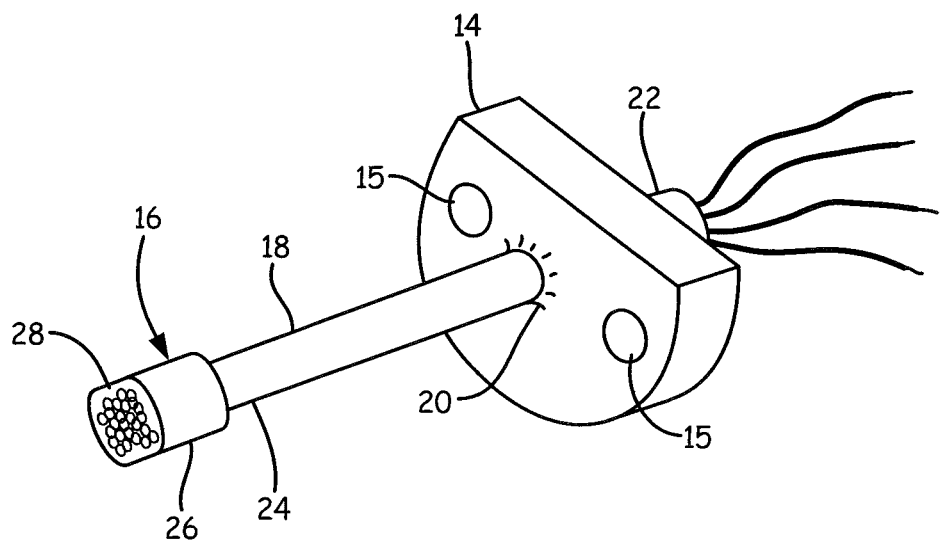
FIG. 2 is a diagrammatic view of a pressure sensing probe employing an MI cable in accordance with an embodiment of the present invention.

FIG. 2 is a diagrammatic view of a pressure sensing probe employing an MI cable in accordance with an embodiment of the present invention. FIG. 2 illustrates system 10 with electronics compartment 12 removed. A plurality of wires is coupled to the various metallic rods or conductors that run within MI cable 18 from proximal end 22 to distal end 24. The wires facilitate connecting the rods to circuitry within compartment 12. The metallic rods are insulated from one another and from the metallic sheath that surrounds them by an insulative mineral, such as dry Magnesium Oxide (MgO) powder. The manufacturing technology for MI cable easily allows for variations in MI cable length. Moreover, longer lengths can easily be cut down during the probe manufacturing process to facilitate the provision a variety of probe lengths. It is believed that the MI cable may be as long as one meter and still provide satisfactory operation. The metallic sheath 30 (shown in FIG. 3) of MI cable 18 is welded to flange 14 at reference numeral 20. Numeral 20 can denote any type of seal which seals the MI cable 18 to a process fluid vessel such as a container or pipe. Thus, the proximal end of cable 18 provides a seal end which can be sealed to flange 14 or directly to a process fluid vessel. In fact, sheath 30 may be made quite thick (in comparison to known MI cables) in order to facilitate welding sheath 30 to flange 14 as well as rejecting high process pressures. As illustrated in FIG. 2, distal end 24 of MI cable 18 is coupled to sleeve 26 of sensor assembly 16. Sleeve 26 houses the interconnection between MI cable 18 and the one or more sensors of assembly 16. A metallic screen 28 is preferably welded to sleeve 26 to allow process fluid to contact the sensor(s) of assembly 16, but to otherwise protect the sensor(s) from damage.

Embodiments of the present invention are particularly advantageous when employed in conjunction with capacitance-based pressure sensors formed of a single-crystal material, such as sapphire. The use of MI cable as a secondary seal has a particular advantage when used with such a pressure sensor. These pressure sensors are known. For example, U.S. Pat. No. 6,520,020 discloses such a sensor. However, such pressure sensors have a number of features that require unique mounting and packaging arrangements to fully exploit. Most notable, the pressure sensor, by virtue of its material and design, is suited for directly contacting the process fluid, without the need for an oil-filled isolator system that uses a metal or ceramic isolation diaphragm. The absence of oil, in at least some embodiments, allows such embodiments to tolerate very high process temperatures. Further, the sensor is designed to be brazed into a pressure boundary wall. The braze joint then separates the process pressure side from the ambient side. Accordingly, no glass/metal seal is required. Further still, at least some designs of the pressure sensor include an integral temperature sensor thereby allowing the sensor assembly to detect both temperature and pressure.

Figure 3:
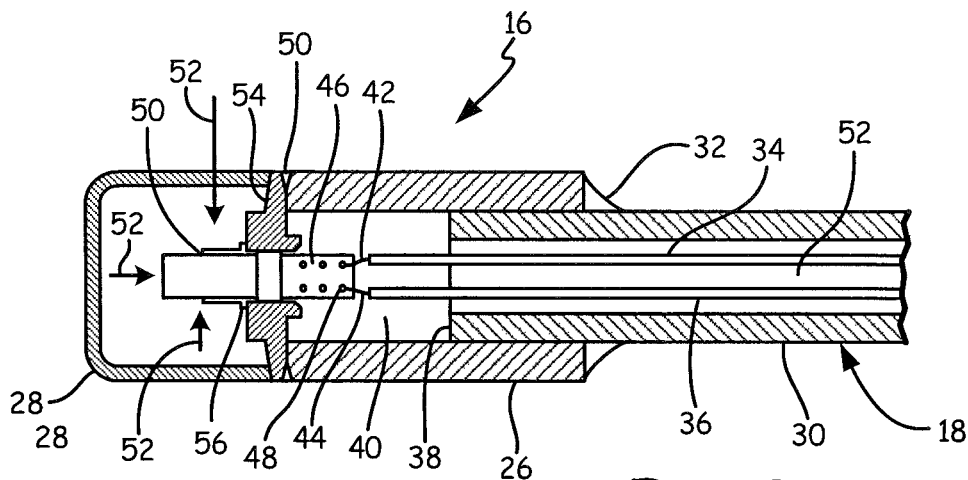
FIG. 3 is a diagrammatic cross sectional view of a pressure sensor assembly of a pressure sensing probe in accordance with an embodiment of the present invention.

FIG. 3 is a diagrammatic cross sectional view of a pressure sensor assembly of a pressure sensing probe in accordance with an embodiment of the present invention. Metallic sheath 30 is welded to sleeve 26 at reference numeral 32. Metallic sheath 30 can be formed of any suitable material such as stainless steel, other suitable alloys including nickel-based alloys such as Inconel®. While some embodiments of the present invention employ a metallic sheath having a constant internal diameter, the internal diameter of sheath 30 can decrease as one moves from the distal end 24 to the proximal end 22. Thus, process pressure would further compact the MgO filling 52 potentially raising the pressure rating of the seal.

MI cable 18 includes a plurality of metallic rods (conductors) 34, 36 that extend from proximal end 22 to a location 40 beyond end 38 of sheath 30. Each individual rod 34, 36, is electrically coupled, preferably by welding, to a conductive interconnect 42, 44, respectively, that is further coupled to a respective connecting pad or trace 46, 48 on pressure sensor 50. Each rod 34, 36 is spaced and insulated from every other rod 34, 36 as well as metallic sheath 30 by insulative mineral 52. Pressure sensor 50 can be a known capacitance-based pressure sensor formed of a single-crystal material such as sapphire, or any other suitable pressure sensor. In operation, the process fluid pressure acts in the directions illustrated by arrows 52 to compress sensor 50. This compression of sensor 50 causes a deformation that causes a change in the distance between the layers that form sensor 50. Conductive plates are deposited on the inside surfaces of pressure sensor 50 such that the deflection causes a change in capacitance between the conductive plates. This change in capacitance is detected by suitable circuitry disposed in electronics compartment 12 and coupled to pressure sensor 50 via MI cable 18. Pressure sensor assembly 16 may be inserted into a process fluid vessel such as a pipe or tank wall and mounted thereto by flange 14. However, other mounting techniques may be used including direct mounting the cable 18 to an opening in the process fluid vessel. Further, embodiments of the present invention can also be practiced where pressure sensor assembly 16 is inserted into an impulse tube for use in a differential pressure flow application. Further, the high temperature tolerance of at least some embodiments of the present invention may allow the sensor assembly to be used in a steam sensing environment with minimal impulse tubing. Additionally, in some embodiments, pressure sensor 50 may include a temperature sensor, such as a resistance temperature detector, that provides an electrical indication, such as resistance, that varies with process fluid temperature.

As shown in FIG. 3, pressure sensor 50 is coupled to sensor mounting member or disc 54 at reference numeral 56. This connection is preferably a braze joint that both mounts and seals pressure sensor 50 to disc 54. Disc 54, in turn, is welded to sleeve 26 at reference numeral 58. The construction illustrated in FIG. 3 provides a number of useful features. For example, in the event that pressure sensor 50 is broken off or otherwise fractured, process fluid passing through the aperture in sensor mounting disc 54 will not pass through MI cable 18, thereby ensuring that process pressure will be retained. An additional feature of the arrangement shown in FIG. 3 is that the MI cable/sensor assembly has a relatively small diameter that allows much lighter process seals (flange seals) to be used. Moreover, given the material reduction, even applications that demand exotic materials (such as subsea applications) can be accommodated with relatively little incremental cost. Further still, the smaller arrangement also facilitates use in smaller areas.

Figure 4:
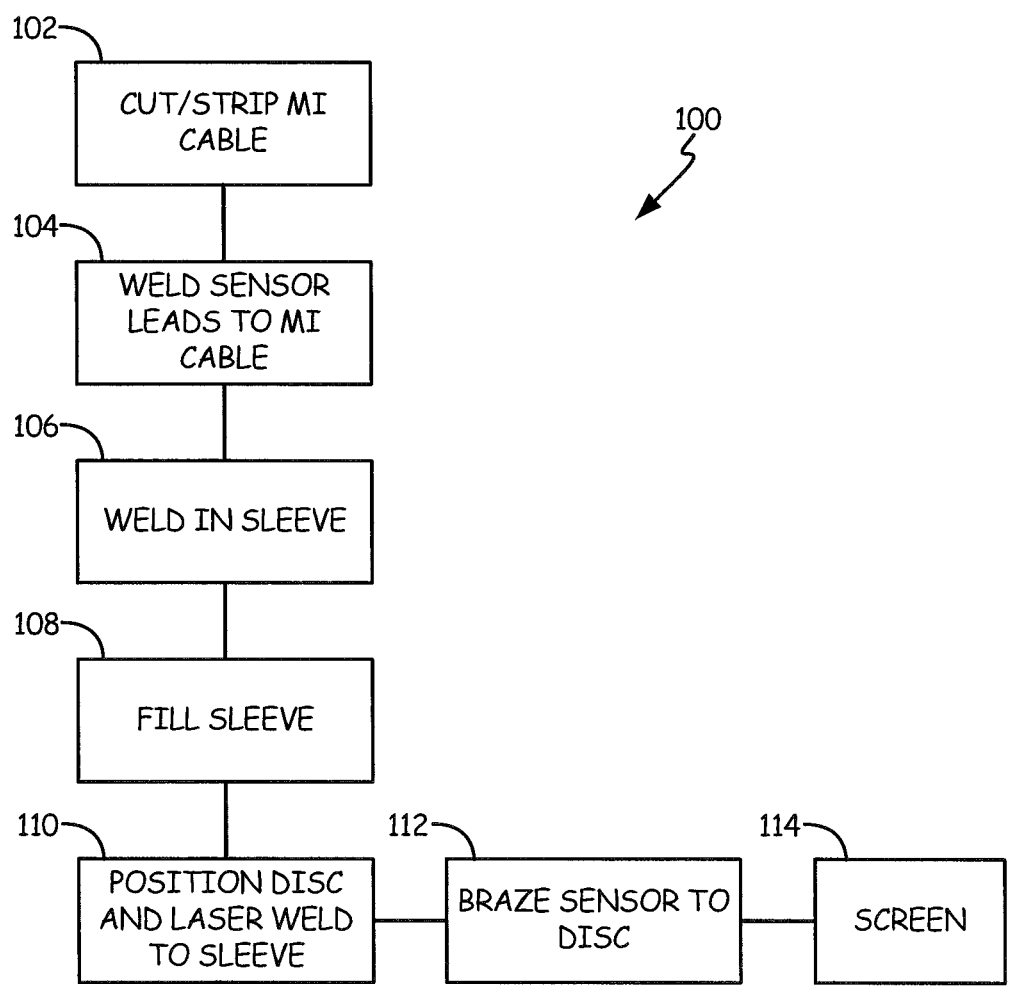
FIG. 4 is a flow diagram of a method of making a pressure sensor assembly in accordance with an embodiment of the present invention.

FIG. 4 is a flow diagram of a method of making a pressure sensing probe in accordance with an embodiment of the present invention. Method 100 begins at block 102 where an MI cable is provided. A portion of the metallic sheath of the MI cable is cut back thereby exposing the mineral and conductors therein. Next, at block 104, the sensor assembly is electrically coupled to respective MI conductors. This operation may include welding a flexible metallic interconnect to each MI conductor and then welding each flexible metallic interconnect to a respective pad or trace on the sensor(s). At block 106, a sleeve, such as sleeve 26, is slid into place and welded to the metallic sheath. At block 108, the sleeve is preferably filled with the dry mineral (MgO).

Next, at block 110, a sensor mounting disc, such as disc 54, is slipped on the assembly. Preferably, the sensor mounting disc has a slot for the pressure sensor. The sensor mounting disc is preferably laser welded to the sleeve. At block 112, the sensor is brazed to the end cap. Finally, at block 114, a screen or other suitable protective member is welded to the sensor mounting disc to complete the pressure sensor assembly. The proximal end of the MI cable is simply passed through an aperture in the flange, such as flange 14, and welded thereto.

Embodiments of the present invention described thus far have provided a pressure sensor that directly contacts the process fluid. However, some advantages may still be had with embodiments that provide an isolation fluid filled isolation system. For example, an isolation fluid filled system provides yet another process barrier. Further, the isolation fluid filled system will reduce or attenuate the temperature sensor's reaction to thermal transients.

Figure 5:
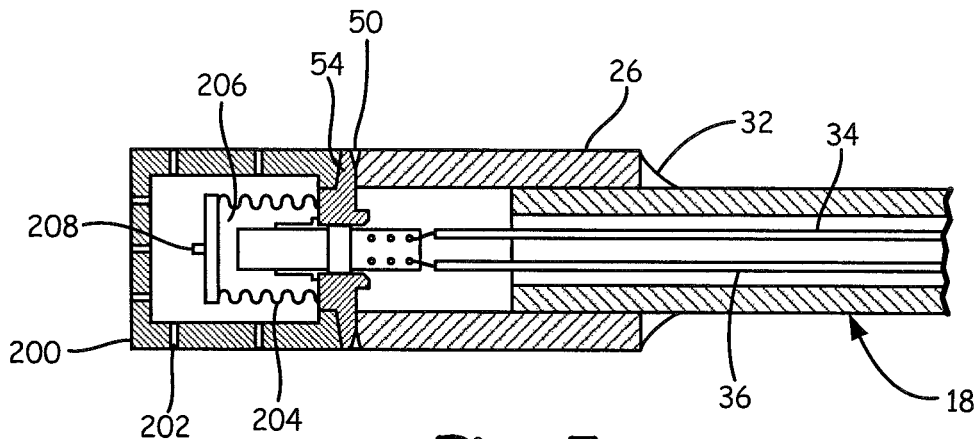
FIG. 5 is a diagrammatic cross sectional view of a pressure sensor assembly of a pressure sensing probe in accordance with another embodiment of the present invention.

FIG. 5 is a diagrammatic cross sectional view of a pressure sensor assembly of a pressure sensing probe in accordance with another embodiment of the present invention. The embodiment illustrated in FIG. 5 bears some similarities to that illustrated in FIG. 3, and like components are numbered similarly. Pressure sensor 50 is surrounded by isolation fluid 206 that is contained by isolation fluid containment system 204. Isolation fluid containment system 204 preferably includes a cylindrical bellows that reacts to process fluid pressure and thereby conveys the process fluid pressure to sensor 50 without allowing the process fluid to actually contact sensor 50. The isolation fluid filled structure 204 is preferably formed of a metal suitable for exposure to the process fluid, such as a nickel-based alloy, for example Inconel®, and is welded to disc 54 using any suitable technique, such as resistance spot welding (RSW). Structure 204 provides a first barrier to failure. The braze joint of pressure sensor 50 to disc 54 provides a second barrier and the MI cable 18 provides yet a third barrier that prevents the process fluid from entering electronics enclosure 12. Depending on the final requirements, structure 204 can have any suitable number of corrugations ranging from no corrugations (a simple thin foil cylinder) to a fully developed metal bellows of suitable material (such as a nickel-based alloy, for example Inconel®) and compliance. Such bellows are commercially available and can be attached to disc 54 with any suitable techniques including resistance spot welding. The isolation fluid-filled structure illustrated in FIG. 5 is, in one embodiment, filled via fill port 208, which is then sealed. In one embodiment, the isolation fluid comprises oil.

Another difference between FIG. 5 and FIG. 3 is that screen 28 has been replaced by a more robust perforated cap 200 having a plurality of perforations 202 therethrough that allow the process fluid access to sensor 50. However, screen 28 and cap 200 are simply examples of protective structures that can be used to protect sensor 50 from mechanical damage while allowing process fluid to access the sensor. Other suitable structures that perform the same functions can be used in accordance with embodiments of the present invention.

Figure 6:
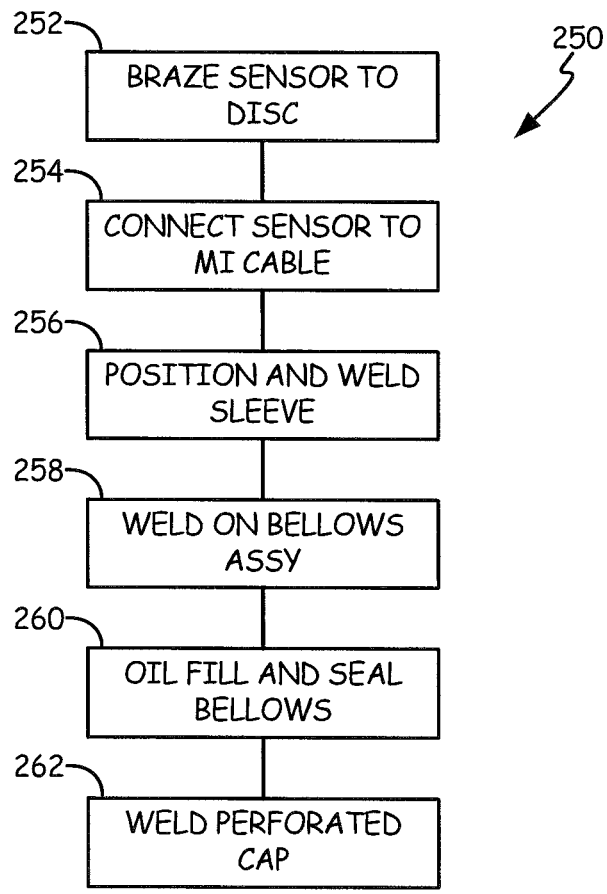
FIG. 6 is a flow diagram of a method of making the pressure sensor assembly of FIG. 5 in accordance with an embodiment of the present invention.

FIG. 6 is a flow diagram of a method of making the pressure sensing probe of FIG. 5 in accordance with an embodiment of the present invention. Method 250 begins at block 252 where a capacitance-based pressure sensor formed of a single-crystal material is brazed to a sensor mounting disc, such as disc 54. Next, at block 254, the MI cable, such as MI cable 18, is electrically coupled to the sensor. In some embodiments, such electrical connection includes the provision of small flexible wires that are welded to rods/conductors of the MI cable and respective pads/traces on sensor 50. Additionally, it is preferred that once the electrical connections are complete, that a sleeve be provided and filled with a dry, powdered mineral. At block 256, the sleeve is slid into place and welded to the metallic sheath of MI cable 18 as well as the sensor mounting disc. At block 258, a bellows assembly is welded to the sensor mounting disc. The bellows assembly is then filled with a substantially incompressible isolation fluid, such as silicone oil, and sealed at reference numeral 260. Next, at block 262, perforated cap, such as perforated cap 202, is welded to the sensor mounting disc. The resulting isolation fluid-filled structure provides an additional process barrier in comparison to the embodiment illustrated with respect to FIG. 3. Moreover, given the thermal mass of the isolation fluid, it is believed that any temperature sensor disposed within sensor 50 will have a damped response to thermal transients in comparison to the FIG. 3 embodiment.

Although the present invention has been described with reference to preferred embodiments, workers skilled in the art will recognize that changes may be made in form and detail without departing from the spirit and scope of the invention. For example, while embodiments of the present invention have been described with respect to a single sensor (having a pressure sensing structure and optionally a temperature sensing structure) coupled to an MI cable, it is noteworthy that commercially available MI cable can be obtained with significantly more cores/rods than required for a single pressure/temperature sensor. Accordingly, embodiments of the present invention also include providing a plurality of pressure/temperature sensor at or near a distal end of an MI cable. Even when such embodiments are provided, it is still believed that a single half inch diameter, or less, MI cable could provide the requisite electrical connections. The flange shown herein is but one example technique for coupling the mineral insulated cable to a process fluid vessel which carries a process fluid. Example process fluid vessels include a container or a pipe. In one example configuration, the proximal end of the mineral insulated cable can be directly sealed to an opening in a process fluid vessel. More than one type of insulative dry mineral may be used at different locations in the device.

What is claimed is:
1. A pressure measurement system, comprising:
a mineral insulated cable having a proximal end and a distal end, the mineral insulated cable including a hollow metallic sheath extending from the proximal end to the distal end which carries a plurality of elongate conductors therein which are spaced apart from one another and from the hollow metallic sheath by an electrically insulative dry mineral;
a hollow sleeve which extends around the hollow sheath at the distal end of the mineral insulated cable and is welded to the mineral insulated cable to form a seal therebetween, the hollow sleeve extending beyond the distal end of the mineral insulated cable;
a mounting disc having an opening formed therethrough, wherein the mounting disc is welded to a distal end of the sleeve;
an elongate pressure sensor formed of a single crystal material having a capacitance which changes in response to an applied pressure and which extends beyond a distal end of the mounting disc and extends through the opening in the mounting disc and into the hollow sleeve and wherein the elongate pressure sensor is brazed to the mounting disc;

a plurality of electrical interconnects in the hollow sleeve which electrically couple the plurality of elongate conductors to respective electrical contacts on a proximal end of the elongate pressure sensor;

an electrically insulative dry mineral which fills the hollow sleeve which electrically insulates the plurality of electrical interconnects;

a process flange having an aperture therethrough and wherein the proximal end of the metallic sheath is sealingly attached to the process flange and the process flange is configured to be sealingly attached to the process fluid vessel; and a protective member which protects the elongate pressure sensor, wherein the protective member comprises an isolation fluid filled system surrounding the elongate pressure sensor, the isolation fluid filled system conveying process pressure to the elongate pressure sensor but otherwise isolating the pressure sensor from process fluid.

2. The pressure measurement system of claim 1, wherein the single crystal material is sapphire.

3. The pressure measurement system of claim 1, wherein the elongate pressure sensor includes a temperature sensitive element electrically coupled to the mineral insulated cable.

4. The pressure measurement system of claim 1, wherein the sheath is formed of stainless steel.

5. The pressure measurement system of claim 1, wherein the sheath has a constant internal diameter.

6. The pressure measurement system of claim 1, wherein the sheath has an internal diameter that decreases from the distal end to the proximal end.

7. The pressure measurement system of claim 1, wherein the mineral is Magnesium Oxide.

8. The pressure measurement system of claim 1, wherein the isolation fluid filled system includes a plurality of bellows.

9. The pressure measurement system of claim 1, wherein the isolation fluid filled system is formed of an alloy of nickel containing chromium and iron.

10. The pressure measurement system of claim 1, and further comprising a second pressure sensor assembly coupled to the mineral insulated cable.

11. The pressure measurement system of claim 10, wherein the mineral insulated cable has a diameter of about 0.5 inch or less.

12. The pressure measurement system of claim 1, and wherein the protective member further comprises a screen.

13. The pressure measurement system of claim 1, and wherein the protective member further comprises a perforated end cap.

* * * * *